Aug. 15, 1939.  A. W. OEHLER ET AL  2,169,472
COMBINE
Filed Sept. 5, 1936  6 Sheets-Sheet 6
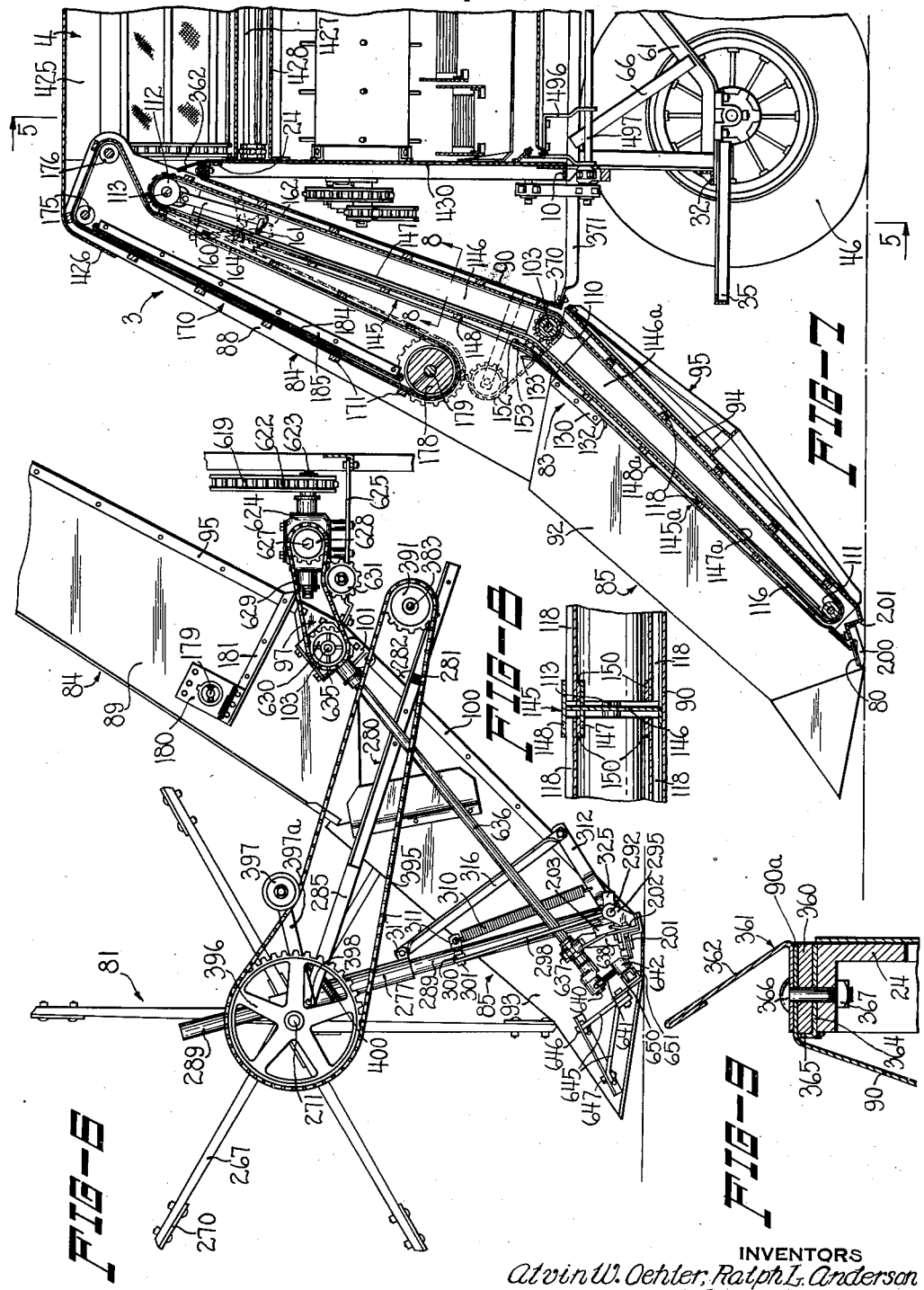
INVENTORS
Alvin W. Oehler, Ralph L. Anderson
and Louis A. Paradise
By Brown, Jackson, Boettcher & Dienner
ATTORNEYS.

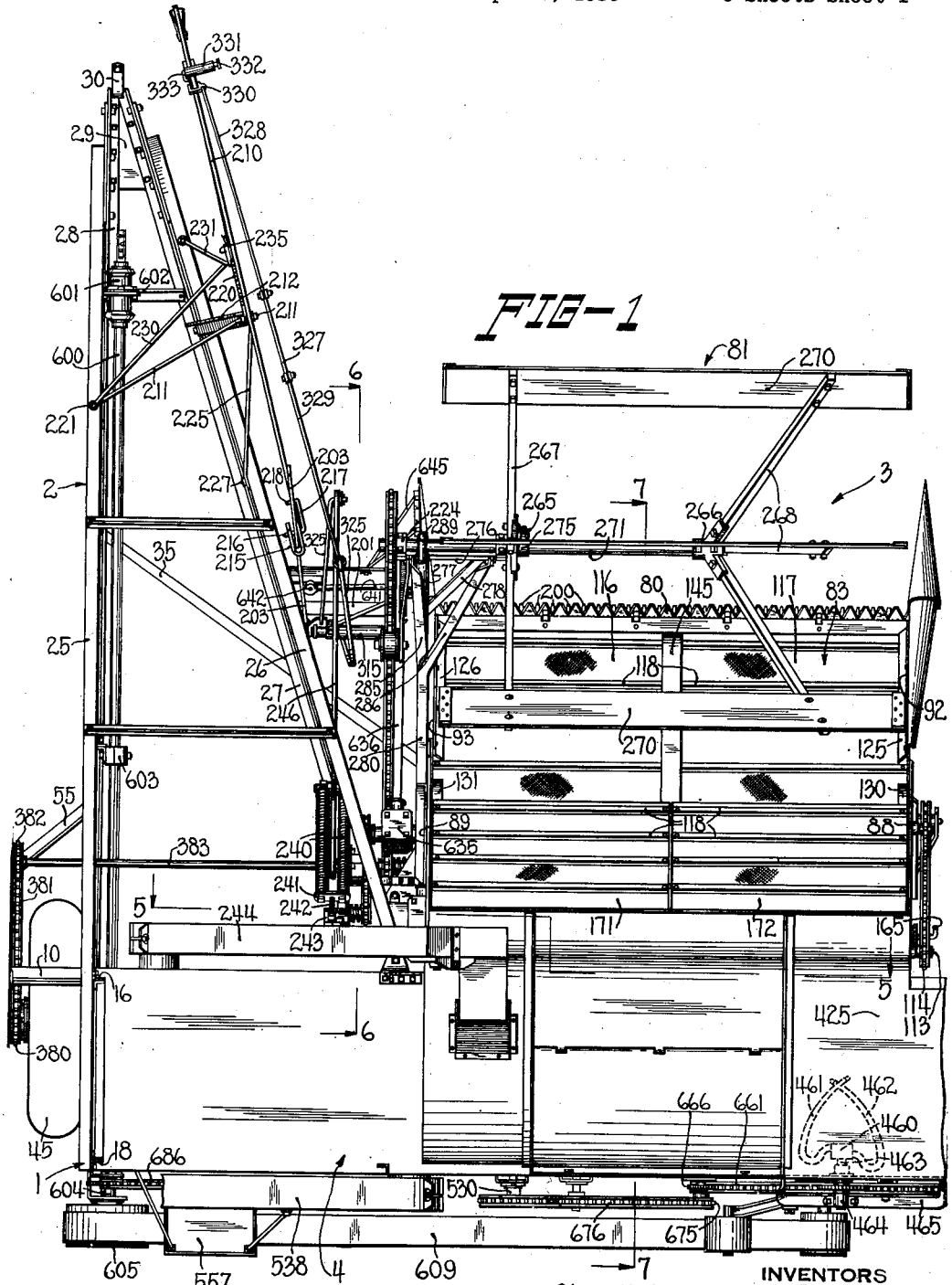

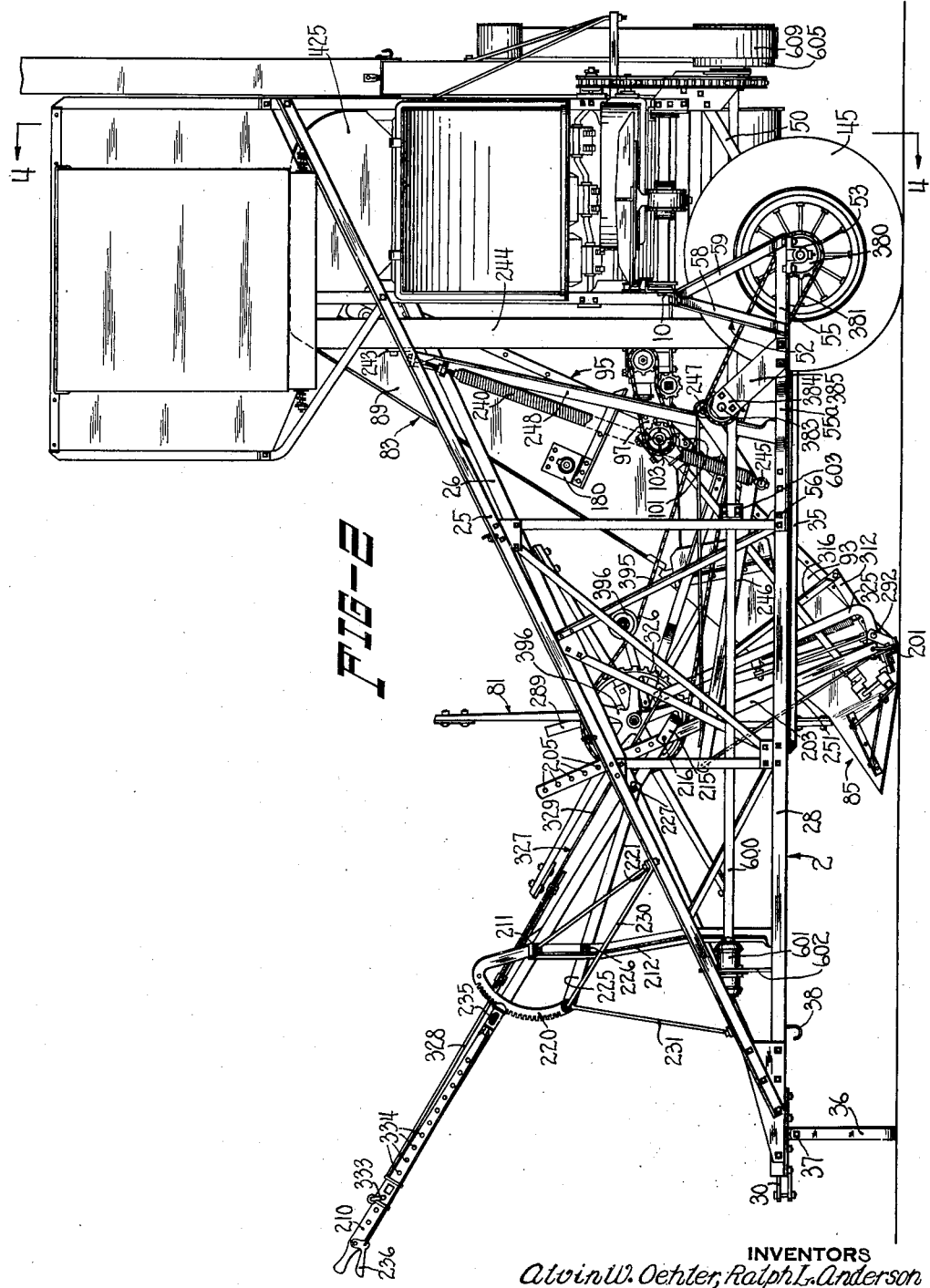

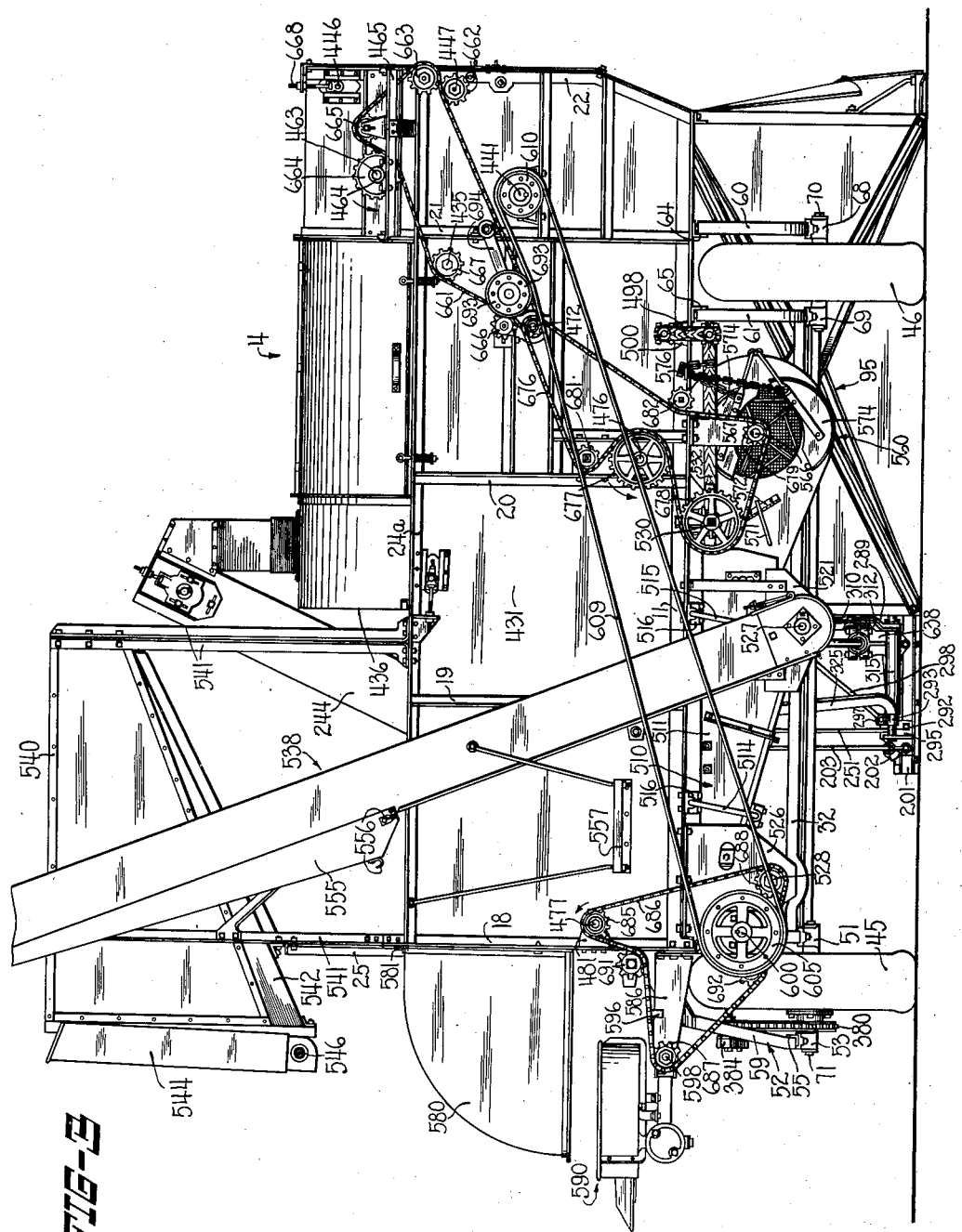

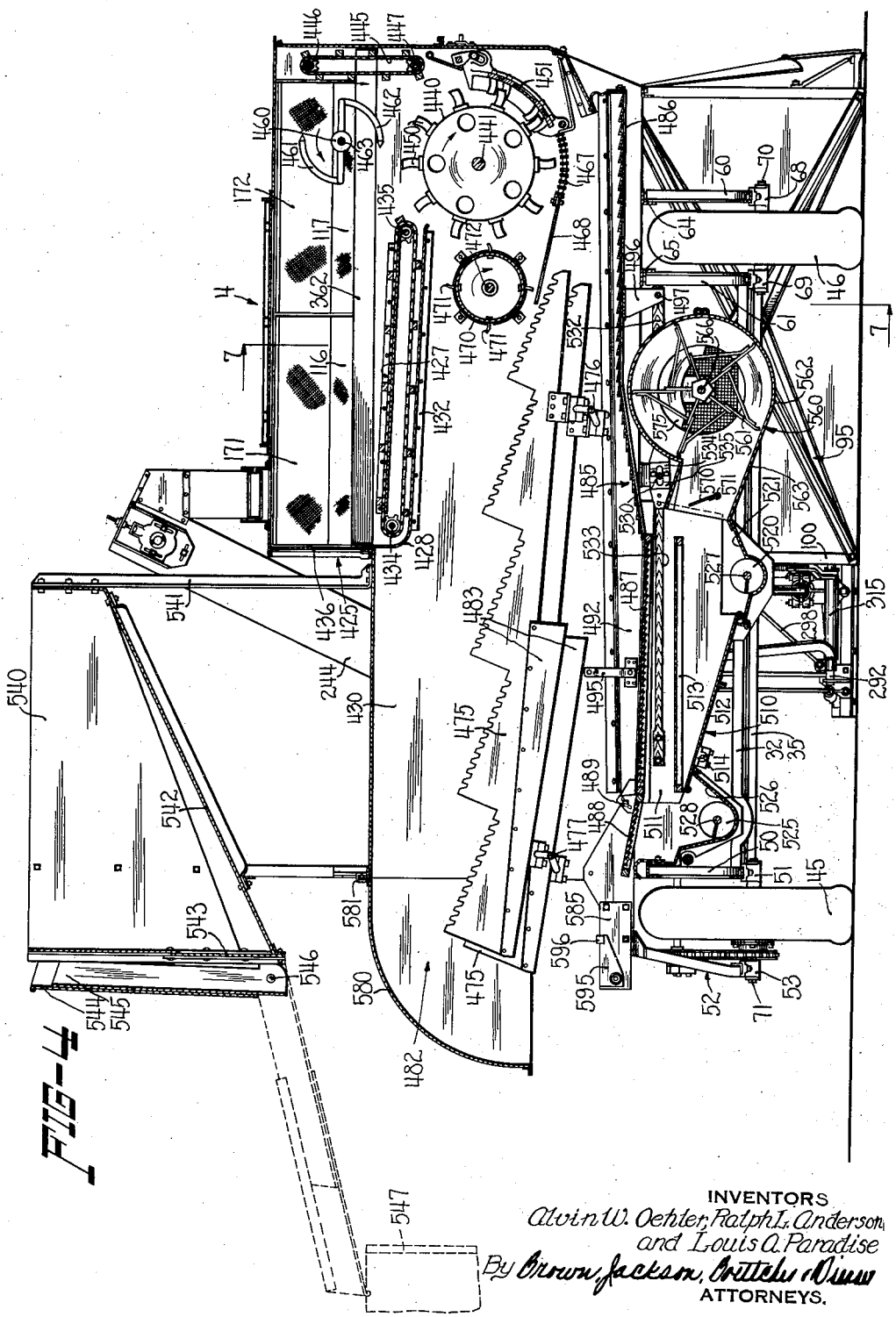

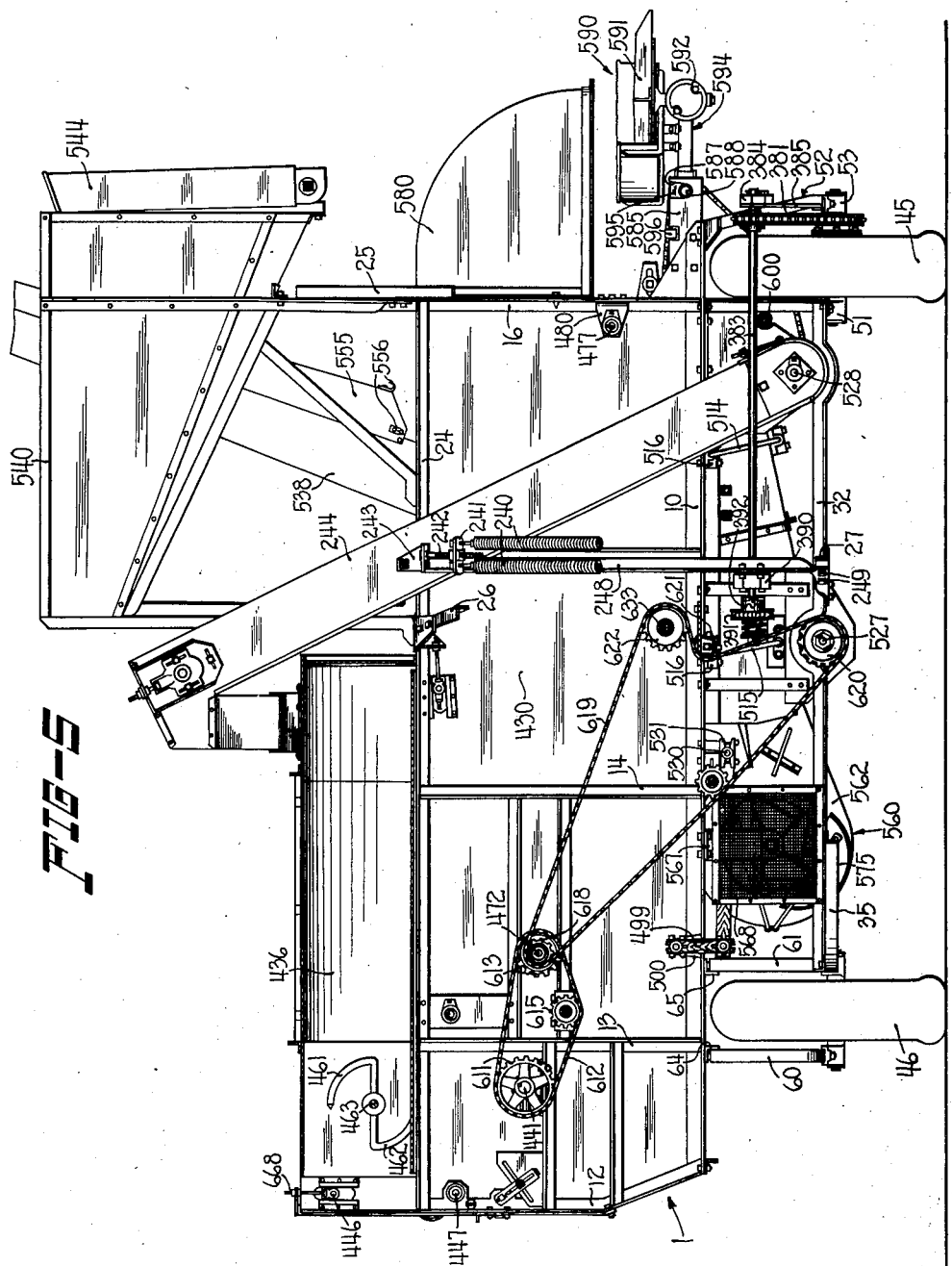

Patented Aug. 15, 1939

2,169,472

UNITED STATES PATENT OFFICE

2,169,472

COMBINE

Alvin W. Oehler, Ralph L. Anderson, and Louis A. Paradise, Moline, Ill., assignors to Deere & Company, Moline, Ill., a corporation of Illinois Application September 5, 1936, Serial No. 99,556

51 Claims. (Cl. 56—20)

The present invention relates generally to combined harvester-thresher machines, and is particularly concerned with the provision of a compact, one-man operated machine that is especially adapted for use in relatively small fields and for harvesting many different varieties of crops.

The principal object of the present invention is the provision of novel operating parts and a novel arrangement of parts so as to produce a relatively small compact, yet efficient, tractor-operated machine that can be easily manipulated in relatively small fields and conveniently controlled by the operator of the tractor propelling the same. In this connection, it is a further object of the present invention to provide a combine in which the thresher unit is disposed transversely of the line of advance and is carried on two laterally spaced ground wheels that are positioned substantially directly under the thresher unit, and to provide a third point of support for the machine at the forward end of a draft frame which is adapted to be attached to the draw bar or similar part of the tractor. A machine of this character easily and conveniently accommodates a frequent turning of corners, a condition that is met with when using combines and other machines in small fields.

Another object of the present invention is the provision of a compact combine, especially adapted for small fields and one-man operation, in which the machine is provided with wheels having individual axles with a clear space therebetween to accommodate parts of the threshing unit, such as the blower, sieves, and other parts, thereby making it possible to provide a machine that has an exceptionally low center of gravity.

An additional object of the present invention is the provision of a combine having a grain bin that is mounted directly above one end of the thresher unit and connected therewith by means of a grain elevator extending up the rear side of the thresher unit, and discharging into the grain bin. By virtue of this construction, no additional space, either rearwardly of the thresher unit, or forwardly over the draft frame or otherwise, is required as is necessary in other machines of this general character with which we are familiar. A further object, in this connection, is the provision for a grain bin that can be emptied by gravity through an extensible spout or the like.

In addition, a further object of the present invention is to provide certain improvements in the threshing units and a new and improved arrangement thereof. Specifically, it is an object of the present invention to provide a platform conveyor or elevator so constructed and arranged as to discharge the harvested material into the feeder house of the thresher unit, with portions of the material falling directly onto the threshing cylinder and with the remainder falling onto a feeder house conveyor that delivers the material to the threshing cylinder. One particular advantage of this arrangement is that the feeder house can be made very compact while yet capable of handling the required volume of grain.

A further object of the present invention, in this connection, is the provision of a beater mounted directly above the threshing cylinder, being particularly arranged so as to engage and move the material along the cylinder substantially at or adjacent the point where the feeder house conveyor delivers material to the threshing cylinder.

Another object of the present invention is the provision of an auxiliary or separating cylinder or stripper positioned after the threshing cylinder, having regard to the direction of movement of the grain, for the purpose of removing straw and the like that has been operated upon by said cylinder.

An additional object of the present invention is the provision of a harvesting unit that has a pick-up conveyor made in two sections, the upper section being immovably fixed to the body of the combine and the lower section being movably connected with the fixed section so that adjustments in height of cutting will not require movement of the entire unit. Also, it is an object of the present invention to provide improved means for securing the harvester unit to the main frame of the combine so as to facilitate the attachment of the harvester unit. It is, further, an object of the present invention to provide conveying means in the form of a pair of separate canvases arranged side-by-side and with novel overlapping guide means between the two canvases to prevent grain from lodging therebetween.

In addition, another object of the present invention is the provision of improved means for driving the cutter bar of the harvester unit so that there is no necessity to have universal joints or the like embodied in the driving train, and a further object of the present invention in this connection is the provision of new and improved reel supporting and adjusting mechanism, it being understood that the reel is capable of substantially vertical adjustment relative to the aforesaid cutting mechanism, and it is also a particular object of the present invention to provide improved reel adjusting means carried on the means that raises and lowers the adjustable part of the platform that carries the cutting mechanism. By virtue of these features, the entire control of the combine can be effected easily and conveniently from the operator's position on the tractor that propels the machine.

Further, another object of the present invention is the provision of new and improved driving connections for the various operating units of the thresher. For example, it is an object of the present invention to drive the threshing cylinder directly from the power take-off shaft which, in turn, is driven directly from the tractor motor.

Another feature of the present invention is the provision of means driving the stripper or separating cylinder directly from the threshing cylinder adjacent which it is mounted.

A further feature of the present invention is that of driving the platform canvases, the grain elevator, the feeder house conveyor, and the beater and vertical conveyor in the feeder house by means connected with the separating or stripper cylinder.

It is also an object of the present invention to drive the straw walkers, chaffer, and fan from the stripper or separating cylinder, and to drive the tailings elevator and the straw spreader at the discharge ends of the straw walkers from the outer straw walker crank shaft.

By virtue of these particular features, a compact, yet efficient, transverse thresher unit is provided which is especially advantageous in small combines and the like.

These and other objects and advantages of the present invention will be apparent to those skilled in the art after a consideration of the following detailed description of the preferred structural embodiment, taken in conjunction with the accompanying drawings.

In the drawings:

Figure 1 is a top view of a combine embodying the features of the present invention;

Figure 2 is an elevation of the machine shown in Figure 1, taken from the left side;

Figure 3 is an elevation of the rear end of the combine;

Figure 4 is a generally transverse section taken through the thresher substantially along the plane of the line 4—4 of Figure 2;

Figure 5 is a transverse view looking rearwardly, with certain parts in a section taken substantially along the line 5—5 of Figures 1 and 7;

Figure 6 is a view taken substantially along the line 6—6 of Figure 1, and illustrates the driving means for the reel and cutting mechanism;

Figure 7 is a section taken substantially along the line 7—7 of Figure 4, and shows the principal parts of the pivotally interconnected platform sections and elevator canvases;

Figure 8 is a section taken on an enlarged scale along the line 8—8 of Figure 7, and shows the center guide which overlaps the adjacent portions of the parallel platform canvases; and Figure 9 is an enlarged detailed section illustrating the manner of attaching the upper edge of the fixed platform section to the forward upper edge of the frame of the combine.

Referring now to the drawings, more particularly to Figures 1 and 2, it will be seen that the combine chosen to illustrate the principles of the present invention comprises a transversely disposed frame 1, a generally longitudinally disposed draft frame 2 extending forwardly at one end of the main frame 1 and serving as means for transmitting draft thereto, a harvester unit 3 including cutting and elevating mechanism, and a threshing unit 4.

The main frame of the combine includes a pair of transversely disposed longitudinally spaced frame bars 10 and 11 (Figures 3 and 5) to which the lower ends of a series of front vertical bars 12 to 16 (Figure 5) and rear vertical bars 18 to 22 are attached. The upper ends of the vertical bars are secured to an upper pair of transverse bars 24 and 24a, and other bars, cross braces and the like, as may be necessary, complete the frame.

The draft frame 2 consists of four generally longitudinally extending bars 25, 26, 27 and 28, the forward ends of which converge toward and are bolted to a gusset or hitch plate 29 to which a clevis 30 is fastened. The rear ends of the draft frame angle bars 27 and 28 are fastened to certain of the vertical angle bars and to a lower front horizontal bar 32 forming a part of the main frame, and as best shown in Figure 5, the upper bars 25 and 26 of the draft frame are fastened to the upper part of the main frame, preferably to the upper portion of the vertical bar 16 and the intermediate portion of the front upper horizontal frame bar 24. A diagonal reenforcing bar 35 (Figure 1) extends from the intermediate portion of the draft frame bar 28 across under the other lower draft frame bar 27 to the right hand end of the main frame, preferably being attached to the right hand end of the lower horizontal frame bar 32 (Figure 5). The draft frame 2 also includes suitable cross bracing as may be necessary. A leg or standard 36 is pivoted, as at 37, to the front end of the draft frame and serves to support the front end of the machine when it is detached from the tractor. A small hook 38 or the like may be provided for holding the standard 36 in rearwardly folded position when the machine is in operation in the field.

The major portion of the weight of the machine is carried upon two air wheels 45 and 46 that are disposed substantially directly under the transversely disposed main frame of the combine, in which the thresher operating units are carried as will be described later. It is to be understood, of course, that any type of wheel or any kind of supporting means may be provided if desired, but preferably, according to the principles of the present invention, the supporting means is so disposed as to carry practically all of the weight of the machine. As best indicated in Figures 1, 2, 3 and 5, the supporting wheels 45 and 46 are mounted directly under the thresher unit 4 by means of individual brackets and individual axles upon which the wheels are journaled and are disposed in laterally spaced relation underneath the lower frame bars 10 and 11. The bracket means for the left hand wheel 45 consists of an inner bracket 50 secured directly to one or both of the left hand vertical frame bars 16 and 18, and an axle bracket 51 is suitably secured, as by bolts, to the bracket 50. An outside supporting bracket 52 carries a left hand wheel axle bracket 53 and is in the general form of a triangular truss, the lower member 55 of which extends forwardly and is bent inwardly, as at 55a (Figure 2), and is bolted at 56 to the lower longitudinal frame bar 28 of the draft frame 2. As best shown in Figure 2, the left hand wheel axle bracket 53 for the left hand wheel 45 is secured to the rear end of the member 55, the other members 58 and 59 of the bracket 52 converging upwardly and secured in any suitable manner to the outermost end of the forward transverse frame bar 10.

The bracket means for the right hand wheel 46 is similar to the bracket means for the wheel 45, and consists of right and left hand supporting brackets 60 and 61, each consisting of a generally U-shaped bar having its ends fastened in any suitable manner to the frame bars 10 and 11 or to a pair of cross bars 64 and 65 carried thereby. Each supporting bracket also includes a diagonal brace 66 (Figure 7). Wheel axle brackets 68 and 69 are carried, respectively, by the supporting brackets 60 and 61, and an axle 70 is carried in the brackets 68 and 69 and receives the supporting wheel 46. In a similar way, an axle 71, upon which the left hand wheel 45 is journaled, is carried in the axle brackets 51 and 53. It will be noted that by virtue of the above described construction, the wheels are independently and separately secured to the main frame in laterally spaced disposition, leaving an open or clear space between the wheels to accommodate various parts of the threshing mechanism, as will be referred to later. It will also be noted, particularly from Figures 4 and 5, that the transverse frame bar 32 serves not only to reenforce the inner wheel brackets but, in addition, is disposed forward of the axis of the wheels and, in fact, is directly underneath the front edge of the main frame, and provides a convenient means for attaching certain of the operating parts that are suspended between the wheels 45 and 46.

The harvester unit 3 comprises a cutter bar 80, a reel 81, and a pick-up conveyor 83, together with suitable driving mechanisms therefor. Referring now more particularly to Figures 1 and 7, the harvester unit is disposed directly in front of the thresher unit 4 in substantial transverse parallelism and alongside the draft frame 2, so that the latter and the cutter bar 80, taken together, occupy the entire width of the thresher. The cutter bar 80 is of more or less conventional construction and is mounted for lateral reciprocation by any suitable means at the lower forward edge of the platform or conveyor unit 83. The latter, preferably, is formed in two sections, 84 and 85, the cutter bar 80 being mounted at the lower forward edge of the latter which is pivotally connected to the upper platform section 84 which, in turn, is rigidly connected to the main frame of the combine. The upper fixed platform section 84 consists of the usual side sheets or plates 88 and 89 and a bottom sheet 90 which are reenforced as may be desired by suitable angles and the like. The lower platform or conveyor section 85 is similar, also consisting of side sheets 92 and 93 and a bottom sheet 94 which is reenforced by a truss framework, which is indicated in its entirety by the reference numeral 95 (Figure 7). The lower platform or conveyor section 85 is pivotally connected at its upper end with the lower end of the fixed section 84, and to this end the reenforcing angle bar 95 (Figure 2), which is at the inner side of the fixed section 84, carries a bracket 97, there being a similar bracket at the opposite side of the harvester unit. The lower section 85 also has its lower edges reenforced by suitable angles 100, adjacent the upper ends of which brackets 101 are fastened. These brackets overlap the brackets 97 on the fixed conveyor section 84. The brackets 97 and 101 are apertured and receive a transverse shaft 103, and this shaft 103 serves as a pivot connecting the lower section 85 to the fixed section 84 for generally vertical movement with respect thereto. The side sheets 88 and 89 of the upper section are disposed in overlapping relation with respect to the side sheets 92 and 93 of the lower section, as best indicated in Figure 6.

The shaft 103, forming the pivot axis for the platform sections 84 and 85, serves also as a shaft upon which a canvas roller 110 is mounted. A second canvas roller 111 is journaled for rotation at the lower end of the pivoted platform or conveyor section 85, adjacent the cutter bar 80, and a third canvas roller 112 is mounted at the upper end of the fixed platform or conveyor section on a shaft 113 which extends laterally outwardly at the right side of the machine (Figure 1) to receive a sprocket 114. A pair of parallel platform canvases 116 and 117 are trained over the rollers 110, 111 and 112, and each is provided with the usual wooden slats 118 disposed transversely. While in the preferred form two canvases or conveyor belts 116 and 117 are provided and operate side by side, two belts are not essential in comparatively small platform units, for example, up to approximately six feet in width, but the provision of two separate canvases or conveyor belts is desirable in conveyors of a width greater than six feet. It will be noted that since the pair of canvases 116 and 117 pass around the intermediate roller 110, the shaft 103 of which serves as the pivot axis for the platform sections 84 and 85, the vertical pivotal movement of the lower section does not disturb the operation of the conveyor canvases.

The upper or grain conveying runs of the canvases are guided by suitable means carried by the side sheets 88 and 89 and also by a central guide described below. Referring now more particularly to Figure 1, an angle 125 is fastened to the inside of each of the lower side sheets 92 and 93, and a similar guide angle may be fastened to the inside of each of the upper sheets 88 and 89, if desired. The laterally outer edges of the two canvases 116 and 117 operate under and are held in position by these guide angles 125 and 126. At the point adjacent the pivot axis of the lower section 85 the upper portions of the lower side sheets 92 and 93 carry auxiliary guide angles 130 and 131, the end portions 132 and 133 (Figure 7) of which are turned upwardly.

The space between the two canvas belt conveyors is covered, so as to prevent grain from lodging therebetween, by a longitudinally extending member 145 (Figures 1 and 8) which comprises a vertical web 146 (Figure 8) and a pair of vertically spaced strips 147 and 148 fixed to the vertical web 146 in any suitable manner and overlapping the adjacent edges of the upper runs of the two canvas conveyors 116 and 117. The spacing between the strips 147 and 148 accommodate the wooden slats 118, as best shown in Figure 8, and wear strips 150 are fixed under both edges of the canvas conveyors 116 and 117 to reenforce the latter and also to increase the traction of the belts 116 and 117 on the drums or rollers 110, 111 and 112. The movable platform section 85 is provided with a similarly constructed central guide member 145a (Figure 7) which has a central web 146a and spaced guide strips 147a and 148a. Two overlapping flexible straps 152 and 153 are fixed to the lower strip 148a and embrace the lower end of the upper strip 148 so that in any position of the lower platform section 85, there is a smooth track for the inner end slats 118 of both canvases to bear against and with no projections against which grain can collect.

The conveyor canvases 116 and 117 are maintained at the desired tension by virtue of the shiftable mounting of the upper canvas roller 112. As best shown in Figure 7, the bearing means in which the ends of the roller shaft 113 are journaled is mounted for sliding movement in the side sheets 88 and 89 of the fixed platform unit, and at each end of the roller 112 is a link 160, one end of each being pivoted to the associated bearing block and the other end receiving the crank portion of a shaft 161 that is mounted for rotation in the side sheets of the upper platform section and at one end is provided with a ratchet 162. A pawl 164 is pivoted to the side of the right hand sheet 88 and serves to hold the shaft 161, and hence the upper canvas roller 112, in the desired position. One end of the shaft 161 is formed with a handle 165 (Figure 1) so as to facilitate tensioning the canvases.

An upper canvas elevator or conveyor 170, having the usual slats 171, is disposed above the lower canvas elevator or conveyor and about the upper edge thereof, as best shown in Figure 7. Like the lower canvases, the upper canvas elevator may be made in either one or two sections, as desired. Preferably, however, and as shown in Figure 1, two sections operating side-by-side are provided, and these sections, indicated in Figure 1 by the reference numerals 171 and 172, pass around a pair of upper canvas rollers 175 and 176 (Figure 7) and about a lower drive roller 178 which is mounted on a shaft 179 that is journaled in suitable bearings 180 (Figure 6) in the side sheets 88 and 89, the bearings 180 being reenforced by suitable cross pieces 181 which are connected with the reenforcing angles 95. At its upper inner portion, the upper canvas elevator 170 passes over and partially embraces the upper portion of the lower canvas elevator belts 116 and 117, as best indicated in Figure 7. The upper runs of the upper elevator canvases 170 are supported by a transverse plate 184 attached to the side sheets 88 and 89 by suitable angles 185 or the like.

The upwardly moving lower stretch of the canvas elevator 170 lies loosely on the conveyor belts 116 and 117 and travels at the same speed, so that the upwardly traveling grain, cut by the sickle bar 80 and deposited onto the conveyors 116 and 117 by the reel 81, is held between the two elevators 116, 117 and 170 in the steep upper section of the harvester unit 3, the grain being discharged over the top of the upper roller 112 and into the feeder house of the threshing unit 4. As indicated in Figure 7, the upper strip 148 of the overlapping guide member 145 and that portion of the central web 146 above the lower guide strip 147 are terminated appreciably below the top of the conveyor so as to avoid rubbing of the upper canvas elevator 170 thereon. However, the lower guide strip 147 and the web 146 supporting the same continue upwardly almost to the upper canvas drum 112 to provide adequate support for the adjacent edges of the canvas elevators 116 and 117.

Mention was made above of the fact that the lower platform section 85 is capable of generally vertical movement about the axis of the shaft 103 for the purpose of raising and lowering the sickle bar 80 so as to vary the height of cutting. The means for raising and lowering the platform or conveyor section 85 will now be described. The sickle bar 80 is supported and moves over suitable guide fingers 200 (Figure 7) which in turn, are bolted to the forward flange of a supporting Z-bar 201 which extends laterally from the inner side of the harvester unit 3, as indicated in Figure 1. An eye 202 is bolted to the extended end of the Z-bar 201 and receives the lower end of a vertically extending link 203, the upper end of which is provided with a plurality of openings 205. An adjusting lever 210 is pivotally mounted on the inner end of an elongated bolt or rod 211 that is carried at the upper end of a strut 212 securely fastened to the draft frame bars 26 and 27 adjacent their forward ends. The rear end of the adjusting lever 210 is formed with a loop 215 which is apertured to receive the pivot end 216 of a removable member 217 which has a looped end 218 engageable over the lever 210 for holding the member 217 in position after it has been inserted in the selected one of the holes 205 in the upper end of the link 203 connecting the rear end of the lever 210 with the Z-bar 201 on the movable platform section 85. A sector 220 has one end secured to the upper end of the strut 212 by the inner end of the bolt 211, which, as best shown in Figure 1, is extended laterally and is secured, as at 221, to the horizontal flange of the upwardly extending left hand draft frame member 25. The other end of the sector 220 is connected by means of a bar 225 that, in turn, is bolted to the strut 212 at 226 and to the draft frame bar 26 at 227 (Figure 2). An elongated rod 230, one end of which is threaded and serves as a bolt connecting the sector 220 to the bar 225, is also fastened at 221 to the draft frame bar 25, and a second rod 231 extends from the sector 220 to the inner draft frame bar 26 (see Figure 2). The lever 210 carries detent mechanism 235, which includes a controlling lever 236, that cooperates with the sector 220 in holding the adjusting lever 210 in any position of adjustment about the axis of the bolt 211, whereby the height of cutting by the sickle bar 80 can be determined.

The major portion of the weight of the movable platform section 85 is supported by a pair of balancing springs 240, the upper ends of which are fastened to a plate 241 that is, in turn, adjustably anchored by a bolt 242 to a bracket 243 fastened to any convenient point on the threshing unit of the main frame, as for example, to the tailings elevator 244. The lower ends of the balancing springs 240 are pivotally connected, as at 245 (Figure 2), with a lever 246. The lever 246 is pivotally connected at its inner end to a pin 247 carried in any sutable manner at the lower end of a diagonal frame bar 248 that is fastened at its lower end to the rear end of the draft frame bar 27 by bolts 249 (Figure 5) and at its upper end to the bracket 243. The outermost end of the balancing spring lever 246 is connected by means of a rod 251 to the Z-bar 201, as best shown in Figure 2. The tension in the springs 240 can be adjusted by tightening or loosening the bolt 242 connecting the plate 241 to the bracket 243, whereby it is possible to have the springs 246 support practically all of the weight of the adjustable platform section 85. It is to be noted that the end of the lever 246 between the bolt 245, at which the springs 240 are fastened to the lever 246, and the anchoring pivot 247 is arranged at approximately the same angle as the lower platform section 85 itself. By virtue of this construction, the effective lever arm at which the springs 240 act increases at substantially the same rate as the rate of increase of the effective lever arm between the center of gravity of the pivotal section 85 and the pivot axis 103 thereof.

The reel 81, which is carried by and forms a part of the harvester unit 3, is also mounted for movement vertically toward and away from the sickle bar 80. Referring now more particularly to Figures 1 and 6, the reel 81, which comprises a pair of spiders 265 and 266 carrying arms 267 and 268 (Figure 1) to the outer ends of which reel slats 270 are bolted, is mounted on a reel shaft 271 to which the spiders 265 and 266 are securely clamped, and the shaft 271 is supported for rotation in a pair of laterally spaced journals 274 and 275 carried on a transverse bar 276. The latter is securely fastened, as by welding, to a generally vertically disposed sleeve 277, and a brace 278 extends diagonally from the lower portion of the sleeve to the inner portion of the journal supporting bar 276. Preferably, although not necessarily, the lower end of the diagonal brace bar 278 is welded to the lower end of the sleeve 277, and the upper end is welded to the laterally inner end of the bar 276. A Y-shaped arm 280 is pivoted, as at 281 (Figure 6), to a bracket 282 fastened to the inner platform angle 100 and terminates outwardly in laterally diverging sections 285 and 286 (Figure 1), the outer ends of which are pivoted in any suitable way to the journal carrying bar 276.

A pipe section 289 is extended through the reel supporting sleeve 277, and at its lower end is flattened and is pivoted on the inner end of a shaft 292 by means of a short sleeve 293 (Figure 3) which is mounted on the shaft 292. The latter shaft is supported in a bracket 295 fixed to the outer end of the Z-bar 201 and in a bracket (not shown) fastened to the lower end of the platform angle 100 (Figure 6). The laterally outer end of the sleeve 293 carries a lug 297 to which a brace rod 298 is fastened and which extends generally upwardly to a bracket 300 welded to the pipe section 289 and to which the rod 298 is fastened, as by a bolt 301. Since the lower flattened end of the pipe 289 is welded to the inner end of the tubular sleeve 293 and the brace rod 298 is fastened at its upper end to the pipe 289 and at its lower end to the outer end of the sleeve 293, the reel carrying pipe member 289 is supported against lateral deflection but is permitted to have fore and aft rocking movement about the axis of the shaft 292.

The weight of the reel 81 and associated parts is balanced by a spring 310 which is anchored at its upper end to a lug 311 welded to the pipe member 289, and at its lower end to a lever 312 that is fastened at its lower end to a second sleeve member 315 which is disposed about and journaled on the above mentioned sleeve 293. The outer end of the arm 312 is connected by means of a link 316 to a lug 317 fixed to the lower end of the reel carrying sleeve 277. Thus, the effect of the spring 310 is to tend to swing the arm 312 in a counterclockwise direction (Figure 6) and to exert a thrust through the link 316 to raise the reel carrying sleeve 277, thereby substantially balancing the weight of the reel and associated parts.

The reel 81 may be raised and lowered by swinging the arm 312 upwardly or downwardly, the weight of the reel being balanced by the spring 310 at all times. An arm 325 (Figures 2 and 3) is welded to the outer end of the outer sleeve 315, to which the arm 312 is welded at the inner end thereof, and extends upwardly at 326 (Figure 2) where it is pivotally connected to a generally longitudinally extending link member 327. The link member 327 is extensible and comprises two adjustably connected parts 328 and 329, the latter being the section that is pivotally connected at 326 to the upper end of the reel adjusting arm 325. The forward end of the other link section 328 is connected, at 330, to an adjusting handle 331 that is mounted for movement on the forward end of the platform raising and lowering lever 210. The adjusting handle 331 includes a laterally shiftable detent 332 having an end 333 formed to engage in any one of a plurality of holes 334 formed in the forward end of the platform adjusting lever 210. Thus, by releasing the detent 332 from the hole 334 in which it is engaged, and shifting the handle 331 forwardly or rearwardly along the platform adjusting lever 210, the arm 325 will be rocked fore and aft about the shaft 292 as an axis, and this in turn will cause the arm 312 to exert a thrust through the link 316 to raise and lower the lever carrying sleeve 277 along the pipe 289. It is important to note that both the control for the height of cutting and the control for the position of the reel are not only mounted closely adjacent one another, but are within easy reaching distance of the operator on the tractor propelling the machine.

Reference was made above to the fact that the platform or conveyor 83 of the harvester unit 1 consists of two platform sections, the upper section 84 being fixed to the main frame of the harvester while the lower section is pivotally connected to the fixed upper section. The manner of attaching the upper section 84 will now be described. The bottom sheet 90 of the conveyor section 84 is bent rearwardly, as at 90a (Figure 9), to which portion a strap member 360 is rigidly secured, either by welding, rivets, or the like, and an angle member 361 is also attached to the horizontal portion 90a and extends transversely across the entire width of the bottom sheet 90 and has a flange 362 (Figures 7 and 9) that acts as a grain deflector or apron serving to prevent grain from lodging on the top edge of the frame. The horizontal angle bar 24, forming the upper forward edge of the main frame of the combine, is provided with a sheet metal angle 364 that is welded to the forward edge of the frame bar 24 and is provided with an upwardly turned edge 365. Bolts 366 are disposed in suitable openings in the parts 361, 360 and 24, and, when tightened, serve to securely connect the upper end of the fixed platform section 84 to the main frame of the combine. The purpose of the upturned forward edge 365 is to facilitate assembling the upper section 84 upon the forward edge of the main frame 1 of the machine; that is, by raising the upper section 84 into position and setting the strap 360 upon the flange piece 364, the edge 365 thereof holds the platform section in position until the bolts 366 can be inserted and the nuts 367 started thereon. The bottom support for the upper section 84 consists of a transverse angle 370 (Figure 7) which is fastened to the lower edge of the bottom sheet 90 and to a pair of longitudinal frame bars 371 which are extensions of certain of the cross bars of the main frame. After the upper end of the platform section 84 has been hooked over the flanged edge 365 and the bolts 366 inserted, the lower end is then bolted to the forward ends of the frame bars 371, and then the bolts 366 may be tightened. When this is done, the upper platform section 84 is rigidly secured in fixed position onto the main frame of the combine.

The reel 81 is driven from the left hand supporting wheel 45 by means of a sprocket 380 fixed to rotate with the wheel 45 and connected by means of a chain 381 with a sprocket 382 that is fixedly mounted on the outer end of a shaft 383. The latter is supported at its outer end in a bearing 384 carried on a bracket 385 that is fixed to the frame bar 55, as best shown in Figure 2, and at its inner end the shaft 383 is supported in a bearing 390 fastened to the lower end of the frame brace bar 249. A sprocket 391 is mounted at the inner end of the shaft 383 and is connected therewith through a slip clutch of conventional construction. As best shown in Figure 6, the sprocket 391 is connected by means of a sprocket chain 395 with a large sprocket 396 that is fixed to the inner end of the reel supporting shaft 271. The tension of the sprocket chain 395 is maintained by means of an idler 397 that is mounted on an arm 397ᵃ pivoted on a bolt 398 on the reel supporting sleeve 277. The branch 285 of the reel arm 280 is also pivotally connected to the sleeve 277 at this point. A spring 400 is connected with the sleeve 277 and the arm 397ᵃ, and serves to exert a continuous force acting through the idler 396 against the chain 395 to maintain the proper tension therein, and also to take up the slack that occurs when the vertical position of the reel is adjusted, inasmuch as the reel shaft 271 is not coaxial with the axis 398 and because the shaft 383 is not coaxial with the pivot 281.

As has been referred to above, the threshing unit is mounted in a transverse position and occupies a space directly behind the harvester unit 3 and the draft frame 2, and has its parts supported on the main frame 1 so that, in effect, the latter forms the frame of the thresher unit 4. Referring now more particularly to Figure 4, the harvester unit 4 consists of a feeder house 425 at the right hand end of the frame, and the forward portion of the feeder house 425 includes a hood section 426 (Figure 7) embracing the upper end of the harvester unit, there being an open space between the hood 426 and the apron 362 so as to accommodate the flow of grain therethrough into the feeder house 425. The feeder house extends laterally over the full width of the harvester unit 3, and the left hand portion includes a feeder house conveyor 427 (Figure 4) which operates above a bottom wall 428 that is fastened to the thresher case sheets 430 and 431 by angles 432 or the like. The conveyor 427 is of the usual endless belt type and is supported by pairs of sprockets carried on shafts 434 and 435. The conveyor 427 extends from the left hand end wall 436 of the feeder house 425 to a point adjacent a threshing cylinder 440 that is carried on a threshing cylinder shaft 441 and journaled for rotation at one end of the threshing unit 4. It will be noted that the threshing cylinder 440 is disposed to the right beyond the end of the conveyor 427 so that the latter terminates at a point substantially adjacent to and on the same level as the upper portion of the cylinder 440. A vertically disposed conveyor 445 is mounted adjacent the opposite side of the threshing cylinder 440 and opposite to the feeder house conveyor 427. The conveyor 445 is supported on sprockets carried by shafts 446 and 447. The vertical conveyor acts to push the grain downwardly where it is caught by the teeth 450 of the threshing cylinder 440 and drawn between the teeth on the concaves 451, which comb the kernels of grain from the stalks in the usual manner.

Mounted directly above the threshing cylinder 440 and disposed substantially at the point where the feeder house conveyor 427 discharges material onto the upper portion of the threshing cylinder is a down beater 460 of the spiral type having arms 461 and 462 mounted at their inner ends on a beater shaft 463 that is journaled in the rear wall of the thresher unit with the free ends of the spiral arms extending forwardly in the feeder house. Preferably, as best shown in Figures 1 and 3, the beater shaft 463 is supported for rotation by a journal 464 that is carried on an angle bar 465 that forms a part of the frame of the machine. The purpose of the beater 460 is to distribute the grain over the entire axial length of the threshing cylinder. Without the beater 460 or its equivalent, there is a tendency for the grain to pile up at the rear wall of the feeder house, and the rotation of this beater, in a counterclockwise direction as viewed in Figure 4, shifts the mass of grain forwardly so as to load the threshing cylinder uniformly. In this connection, the vertical beater 445 cooperates therewith and acts to crowd the grain down upon the threshing cylinder to prevent it from clogging and bridging in the feeder house above the threshing cylinder. The formation of the beater arms 461 and 462 is such that they tend to clear themselves of stalks of grain rather than to permit the latter to become entangled and wrapped around the beater.

A grating 467 is fastened to the lower edge of the concaves 451 and extends in the general direction of the rotation of the threshing cylinder 440, as indicated in Figure 4. This grating consists of bars with suitably formed openings therein, and grate fingers 468 in the nature of parallel rods are secured to the edge of the grating 467 opposite the latter's attachment to the concaves 451. The grate fingers terminate under a separating or stripper cylinder 470 that rotates in the same direction as the threshing cylinder 440 and is provided with teeth 471 that strip off any straw or other material that may tend to cling to the teeth 450 of the threshing cylinder 440. The grate fingers 468 at their outer ends overlie a plurality of transversely disposed straw walkers 475, preferably three in number, two of which are shown in Figure 4. The straw walkers 475 are of conventional construction and are supported on two crank shafts 476 and 477 journaled in any suitable manner for rotation on the thresher unit 4. For example, the crank shaft 477 is carried by bearing brackets 480 and 481 supported, respectively, on the vertical frame bars 16 and 18 (Figures 3 and 5). Rotation of the crank shafts 476 and 477 sets up a reciprocatory motion of each of the straw walkers 475 which tosses the straw progressively toward the discharge end 482 of the thresher unit in a manner well known to those skilled in the art. During the progress of the straw in this manner, many kernels of grain are shaken loose and fall into either the combined chaffer and grain pan, described below, or are caught in the straw walker grain pans 483.

The combined chaffer and grain pan is indicated in its entirety by the reference numeral 485 and extends transversely of the machine for substantially the entire length of the thresher unit 4 from a point underneath the concaves 451 and the grating 467 to a point substantially underneath the discharge ends of the straw walkers 475. The grain pan section, indicated by the reference numeral 486, receives the kernels that drop through the grating 467 and the grate fingers 468 and the kernels that are shaken loose from the straw by the right hand portions (Figure 4) of the straw walkers 475. The chaffer section 487 is in the nature of a screen having a pivoted terminal apron 488 whose angular position relative to the chaffer section 477 may be adjustably fixed by a bolt 489 which, when tightened, serves to hold the terminal section 488 in the proper position. This section, like the chaffer section 487, is also in the nature of a screen but has openings larger than the section 487.

The combined chaffer and grain pan 485 is supported on or includes side sheets 492 which are swung on a pair of vertically extending hangers 495 at the left hand end (Figure 4), and at the other end are supported on brackets 496 carried on a rod or bar 497, the ends of which extend outside the thresher unit walls and swung thereon by arms 498 (Figure 3) and 499 (Figure 5) which are pivoted to brackets 500 fastened to the frame bars 10 and 11.

Beneath the combined chaffer and grain pan is a reciprocatory sieve unit 510 which includes side sheets 511, a grain-tight bottom 512, and a sieve or screen 513 fastened to the side sheets 511 in any suitable manner. The sieve unit 510 is supported for rocking movement on pairs of hangers 514 and 515 (Figures 3 and 5), the upper ends of which are pivoted in bearings 516 carried on the frame bars 10 and 11. The fixed clean grain auger 520 is disposed adjacent the lower end of the sloping bottom 512 of the sieve unit 510 and is provided with a hopper 521 to receive the clean grain from the unit 510. The upper end of the sloping bottom 512 of the sieve unit 510 is disposed adjacent a tailings auger 525 disposed in a suitable trough or hopper 526 fixed to the frame of the thresher unit. The clean grain auger 520 is mounted on a shaft 527 and the tailings auger is mounted on the second shaft 528.

The chaffer and grain pan member 485, and the sieve unit 510, are given a continuous shaking movement by a crank shaft 530 that is supported in suitable bearings 531 carried on the frame bars 10 and 11. The crank shaft 530 is connected with the bar 497, upon which the right hand end of the grain pan and chaffer 485 is supported, by means of a connecting rod 532, best shown in Figure 4, and the shaft 530 is connected with the sieve unit 510 by a similar connecting rod 533. The connecting rod 532 preferably is connected with the associated crank portion of the shaft 530 by means of a bearing block 534, and the other connecting rod 533 is fastened to the associated crank portion of the crank 530 by means of a bearing block 535. Thus, whenever the shaft 530 is rotated, the combined chaffer and grain pan structure 485 and the sieve unit 510 are oscillated, as will be clear from Figure 4. The crank portions of the shaft 530 to which the connecting rods 532 and 533 are connected are disposed substantially 180 degrees apart, so that the motion of the sieve unit 510 is in opposition to the motion of the combined chaffer and grain pan structure 485, thus minimizing the vibration transmitted to the thresher frame. The shaking movement of the combined chaffer and grain pan structure 485 tends to toss the kernels of grain from the grain pan section 486 toward the chaffer section 487 in a progressive manner until the kernels reach the screen section, pass therethrough, and pass through the sieve 513, from whence they move down the sloping bottom wall 512 into the clean grain auger 520. Unthreshed heads and other material that do not pass through the sieve 513 are discharged into the tailings auger 525. The clean grain auger 520 is a part of a clean grain elevator indicated in its entirety by the reference numeral 533 in Figure 3, and this elevator receives the clean grain and elevates the same upwardly into a grain bin 540 supported on top of the thresher unit by frame bars 541 directly over the thresher unit and to one end of the feeder house 46. The bottom 542 of the grain bin slopes downwardly to a discharge gate 543 in the outer wall of the bin, and a pair of telescoping spouts 544 and 545, which are pivoted at 546 to the grain bin adjacent the gate 543 and normally kept folded in the position shown in Figure 4, are adapted to be lowered and extended, as indicated by dotted lines in Figure 4, so as to empty the grain bin 540 by gravity and to discharge the clean grain into a wagon, such as the one indicated at 547.

The tailings auger 525 is a part of the tailings elevator, indicated in its entirety by the reference numeral 244, which receives the material that passes through the screen section 487 but which does not pass through the sieve 513, and conveys the grain upwardly and discharges the material into the feeder house 436 and onto the feeder house conveyor 427 for passage through the thresher unit a second time.

The clean grain elevator 533 is disposed at a slight angle from the vertical, as best shown in Figure 3, and has a fine sieve (not shown) on the under side thereof adjacent an enlarged portion in the form of a trough 555. The sieve separates small weed seeds from the grain and delivers them through the trough 555 into a sack (not shown) that may be placed over hooks 556 mounted on the trough and supported by a platform 557 mounted on the thresher unit 4 underneath the mouth of the trough 555. The clean grain elevator 533 extends up the rear side of the thresher unit, as best shown in Figure 3, while the tailings elevator extends up the forward side thereof, as best shown in Figure 5.

Referring again to Figure 4, a blower, indicated in its entirety by the reference numeral 560, is carried underneath the frame bars 10 and 11 and is provided with a fan 561 and a fan housing 562 having a discharge end 563 that directs the blast of air along the screen section 487 and the sieve 513. The fan 561 is carried on a fan shaft 566 which is journaled in suitable bearings carried by brackets 567 bolted or otherwise secured to the frame bars 10 and 11, as best shown in Figures 3 and 5. A screen 568 protects the intake portion of the front side of the fan housing 562, and a second screen (not shown) may be provided for protecting the rear intake opening. The fan housing discharge portion 563 is provided with a pivoted damper or deflector 570 that is mounted on a shaft 571 which has an end turned (Figure 3) to form a handle that cooperates with a notched plate 572 by which the discharge damper may be maintained in adjusted position for determining the volume of air delivered by the fan 561. The volume of air is also controlled by two sets of intake dampers 574 and 575 which are mounted on interconnected pivot arms and held in position by chains 576 (Figure 3) which can be fastened over a hook or the like carried by the frame member 11. The blast of air from the fan 561, controlled by the dampers 570, 574 and 575, is driven along the sieve 513 and the screen 487, and separates the dust, chaff, and the like from the grain as the latter falls through the screen 487 and sieve 513 and into the clean grain auger 520. Such dust, light chaff, and the like is discharged with the straw coming from the straw walkers 475 to the opening 482. A hood 580 is provided with hooks 581 which may be engaged over a flange on one of the frame bars, and if desired the hood 580 may be hooked or otherwise secured to the upright angles 16 and 18.

The hood 580 is so constructed that the straw, chaff, dust and the like coming from the thresher unit is discharged in a downward direction. Adjacent this point the thresher unit frame carries a pair of brackets 585 and 586 that are notched, as at 587 (Figure 5), to receive the transverse supporting bar 588 which forms a part of a straw spreader 590. The straw spreader 590 includes a rotatable vaned member 591 which is driven by gears enclosed in a housing 592 that extends from and is supported by a transverse member 588 above referred to. The gear box 592, together with the supporting member 588, forms a part of a pipe supporting frame 594 for the straw spreader, and the member 588 and the pipe frame 594 carry arms 595 that are welded or otherwise secured to the end portions of the member 588 and are adapted to be hooked underneath lugs 596 that are carried on the supporting brackets 585 and 586. Thus, the straw spreader 590 may be attached very conveniently and easily by inserting the pipe frame member 588 into the slots 587 while moving the spreader at an angle so as to engage the arms underneath the lugs 596. The removal of the straw spreader is effected by swinging the spreader about the axis of the pipe section 588 until the spreader can be lifted out of the notches 587 and from underneath the lugs 596. The gears within the housing 592 are driven in any suitable manner from a shaft 598 that is mounted in coaxial relation with respect to the pipe frame member 588 and extends rearwardly of the latter, as best shown in Figure 3.

It is to be noted that the sieve unit 512 with its clean grain auger 520, the tailings elevator auger 525, and the blower 560 are suspended below the frame bars 10 and 11 and between the wheels 45 and 46 and under the body of the thresher unit. It is to provide space for these parts that the wheels 45 and 46 are individually and separately supported on the individual stub shafts 70 and 71, instead of mounting the wheels on a through shaft, thus providing a design that is compact and, in addition, has a low center of gravity that insures a stable machine.

Power for driving the operating parts of the combine, other than the drive for the reel, is derived from the tractor motor. The purpose of driving the reel from the implement wheel 45 is to maintain the peripheral speed of the reel substantially the same as, or slightly greater than, the rate of advance of the implement over the field for the purpose of obtaining the proper operation of the reel in laying the cut grain down on the platform elevator canvas. Referring now more particularly to Figures 1 and 2, the reference numeral 600 indicates the power take-off shaft which is driven from the tractor motor. The front end of the power take-off shaft 600 is supported by suitable bearing means 601 in a bracket 602 supported on one of the cross bars adjacent the forward end of the draft frame 2, and the intermediate portion of the power take-off shaft 600 is supported by a bearing 603 (Figure 1) that is fastened to one of the vertical frame bars connecting the upper and lower draft frame bars 25 and 28. At the back of the harvester unit 4, the rear end of the power take-off shaft 600 is supported in a bearing 604 and receives a pulley 605 securely mounted thereon in any desired manner. A drive belt 609 is trained over the drive pulley 605 and extends laterally to the right and upwardly (Figure 3) and is trained over a driven pulley 610 that is mounted on the threshing cylinder shaft 441. Thus, the power for driving the threshing cylinder is taken directly from the power take-off shaft 600. The pulley 610 is mounted, as by a key or the like, on the rear end of the threshing cylinder shaft 441, and at the forward end of this shaft a sprocket 611 is fixed and receives a sprocket chain 612 that is trained over a sprocket 613 mounted on the separating cylinder shaft 472, whereby the separating or stripper cylinder 470 is driven from the threshing cylinder 440. The sprocket chain 612 also passes over an idler sprocket 615 by which the tension of the chain 612 can be adjusted. A second sprocket 618 is fixed to the forward end of the separating cylinder shaft 472 and receives a sprocket chain 619 that extends downwardly and passes over a sprocket 620 that is fixed to the clean grain auger shaft 521, by which the clean grain elevator is driven from the separating cylinder 470. The sprocket chain 619 extends upwardly over an idler sprocket 621 and around another sprocket 622 (Figures 5 and 6) that is mounted on a shaft 623 that is journaled in and supported by a gear box 624 that is carried on a bracket 625 rigidly fastened to the main frame. Referring now to Figure 6, the gear box 624 contains a gear set that drives a transverse shaft 627 carrying a sprocket 628 around which a sprocket chain 629 is trained and which passes around a sprocket 630 that is fixed to one end of the elevator conveyor shaft 103 which, it will be remembered, serves as the pivot axis for the relatively movable platform sections 84 and 85. An idler sprocket 631 serves to provide means for adjusting the tension of the driving sprocket chain 629.

Disposed about the roller shaft 103 and fixed to move with the lower platform section 85 is a second gear box 635 in which suitable gear means is disposed and driven from the shaft 103 for the purpose of driving a sickle shaft 636. The shaft 636 is supported by suitable bearings carried in one wall of the gear box 635 and another bearing 637 supported by a bracket 638 (Figures 3 and 6) that is carried by the supporting Z-bar 201. A crank 640 is carried at the lower end of the shaft 636 and is connected by means of a pitman 641 with the left hand end of the sickle bar 80, as indicated at 642 in Figure 1 and in Figure 6. This end of the Z-bar 201 is reenforced by suitable braces 645 that are fastened at 646 and 647 to the lower end of the left hand platform sheet 93 and at their rear ends to a shoe 650 that is secured to the Z-bar 201 and which also supports a guide 651 for the sickle head to which the left end of the pitman bar 641 is connected. Since the lower platform section 85 pivots around the drive shaft 103, and since the gear box 635, which is supported on the lower section 85, also pivots around the shaft 103, it will be seen that the driving mechanism for the cutter bar 80 accommodates itself to any position of the lower section of the platform 83 without universal joints or the like.

The beater 460, the vertical conveyor 445, and the feeder house conveyor 427 are also driven from the separating cylinder shaft 472. The shaft 472 carries a sprocket 660 (Figure 1) over which a sprocket chain 661 is trained. The chain 661 passes over a sprocket 662 fixed to the shaft 447 of the lower roller for the vertical conveyor 445, around an idler sprocket 663 mounted adjacent the sprocket 662 and over a third sprocket 664 fixed to the beater shaft 463, as best shown in Figure 3. The chain 661 also passes over idler sprockets 665 and 666, and, in addition, the chain 661 is trained over another sprocket 667 that is fixed to the rear end of the shaft 435 for the right hand conveyor roller for the feeder house conveyor 427. The bracket supporting the idler sprocket 665 is shiftably fastened to the frame bar 465 so as to provide for adjusting the tension of the chain 661. The driving tension in the vertical conveyor 445 is adjustable by nut and bolt means 668 shown in Figures 3 and 5.

A second sprocket, indicated by the reference numeral 675 in Figure 1, is fastened to the shaft 472 of the separating or stripper cylinder 470, and a chain 676 is trained around the sprocket 675, a sprocket 677 fixed to the outer end of a straw walker crank shaft 476, a sprocket 678 fixed to the outer end of the shaft 530 that drives the combined chaffer and grain pan 485 and the reciprocatory sieve unit 510, and around a third sprocket 679 fixed to one end of the fan shaft 566. Idler sprockets 681 and 682 provide for the proper position and tensioning of the chain 676.

The straw spreader 590 and the tailings elevator 550 are driven from the left hand straw walker crank shaft 477 by means of a sprocket 685 that is fixed to the rear end of the straw walker crank shaft 477 and which receives a chain 686 that is trained around a sprocket 687 fixed to the straw spreader drive shaft 598 and a sprocket 688 fixed to the rear end of the tailings auger shaft 528. Idler sprockets 691 and 692 maintain the chain 686 in the proper position, and a belt tightening idler 693 is carried on an arm 694 and serves to maintain the proper tension in the driving belt 609.

While we have described above the preferred construction in which the principles of the present invention have been embodied, it is to be understood that our invention is not to be limited to the specific details shown and described, but that, in fact, widely different means may be employed in the practice of the broader aspects of my invention.

What we claim, therefore, and desire to secure by Letters Patent is:

1. A combine comprising a transversely disposed thresher unit, a forwardly facing harvester unit, a frame supporting said units, and ground wheels journaled on said frame and disposed directly underneath said thresher unit and inwardly of the laterally outer ends thereof.

2. In a combine, a transverse main frame comprising upper and lower transverse bars spaced fore and aft, thresher mechanism carried by said frame upon said bars, brackets connected with said spaced transverse frame bars laterally inwardly of their ends and extending downwardly therefrom, and ground wheels mounted for rotation on said brackets and disposed thereby directly underneath said thresher mechanism so as to carry substantially all of the weight thereof.

3. A combine comprising a transversely disposed thresher unit, a frame supporting said unit, ground wheels journaled on said frame and disposed directly underneath said thresher unit and laterally inwardly of the ends thereof, a forwardly facing harvester unit connected to said thresher unit adjacent but laterally inwardly of one end thereof, and a forwardly extending draft hitch frame rigidly secured to said supporting frame adjacent but laterally inwardly of the other end of said thresher unit.

4. A combine comprising a transversely disposed thresher unit, a forwardly facing harvester unit, a frame supporting said units, separate downwardly extending brackets spaced apart laterally and secured to said frame, and separate ground wheels individually mounted on said brackets and directly underneath said thresher unit.

5. A combine comprising a main frame having transverse and vertical bars spaced fore and aft, a harvester unit carried at least in part on said frame, separate downwardly disposed brackets fastened to the ends of said transverse bars in laterally spaced relation, ground wheels journaled for rotation on said brackets and connected thereby to said main frame independently of one another, and a thresher unit carried by said frame directly above said wheels and including operating parts disposed above said transverse bars and other operating parts carried below said bars and in the space between said ground wheels.

6. A combine comprising a transversely disposed thresher unit, a harvester unit connected on the forward side of said thresher unit and delivering material to the latter, a frame supporting said units, a grain bin carried by said frame directly above said thresher unit, an elevator carried on one side of said thresher unit between the ends thereof and adapted to deliver grain from the thresher unit upwardly into said grain bin above said thresher unit, and spout means for discharging said grain bin by gravity.

7. A combine comprising a generally transversely disposed main frame, a thresher unit carried thereby including a longitudinally disposed threshing cylinder and a transversely movable conveyor adapted to deliver material to said cylinder, and a harvester unit including a longitudinally disposed platform elevator extending to points adjacent said conveyor and one end of said cylinder and arranged to deliver a part of the crop directly onto said threshing cylinder and the remainder directly onto said conveyor.

8. A combine comprising threshing mechanism including a rotatable threshing cylinder, a conveyor for delivering material to said cylinder, a harvester unit including an elevator for raising said material from the ground and delivering said material to said conveyor, and a beater located substantially directly above said cylinder adjacent the point where said conveyor delivers material thereto, said beater being arranged to distribute said material across the cylinder.

9. A combine comprising a generally transversely disposed main frame, a thresher unit carried thereby including a longitudinally disposed threshing cylinder and a transversely movable conveyor adapted to deliver material to said cylinder, a harvester unit including a longitudinally disposed platform elevator extending to points adjacent one side of said transversely movable conveyor and one end of said cylinder, said platform elevator serving to deliver a part of the crop directly onto said threshing cylinder and the remainder directly onto said conveyor, and a beater located substantially directly above said cylinder and adapted to distribute material along the cylinder in a direction generally parallel with respect to its axis and generally transverse with respect to the oncoming material delivered to the cylinder by said conveyor.

10. In a comb'ne, a feeder house, harvesting mechanism including a platform elevator for discharging material into said feeder house, a threshing cylinder mounted for rotation at one end of said feeder house, a feeder house conveyor extending from the other end of said feeder house to said cylinder and terminating at a point spaced from said one end of the feeder house and adjacent and substantially at the same level as the upper portion of said threshing cylinder, whereby a portion of the material delivered into the feeder house falls directly onto said threshing cylinder and the ramainder of said material falls onto said conveyor and is delivered thereby to the upper portion of said threshing cylinder, and a spiral beater disposed substantially directly above said threshing cylinder for shifting the material reaching the threshing cylinder generally axially away from the material falling directly onto said cylinder from said platform elevator.

11. In a combine, a generally transversely disposed main frame, a longitudinally disposed threshing cylinder, a transversely movable conveyor adapted to deliver material to said cylinder and terminating adjacent to and substantially at the same level as the upper portion of said cylinder, the platform elevator arranged to discharge a portion of the material which it conveys directly onto said cylinder and the remainder onto said transversely movable conveyor, a beater located substantially directly above said threshing cylinder to distribute material along the same, and a separating cylinder disposed adjacent said threshing cylinder and adapted to engage the material after it has been acted upon by said threshing cylinder.

12. In a combine, a generally transversely disposed main frame, a longitudinally disposed threshing cylinder, a transversely movable conveyor adapted to deliver material to said cylinder and terminating adjacent to and substantially at the same level as the upper portion of said cylinder, the platform elevator arranged to discharge a portion of the material which it conveys directly onto said cylinder and the remainder onto said transversely movable conveyor, a beater located substantially directly above said threshing cylinder to distribute material along the same, and a separating cylinder disposed adjacent said threshing cylinder and rotatable in the same direction so as to strip off any material that tends to cling to said threshing cylinder.

13. In a combine, a main frame, a harvester unit connected therewith and including a pair of pivotally connected platform sections, and means rigidly connecting the upper platform section to said main frame.

14. In a combine, a main frame, a harvester unit connected therewith and including a pair of pivotally connected platform sections, means rigidly connecting the upper platform section to said main frame, and means for raising and lowering the other platform section to vary the height of cutting.

15. In a harvester, a platform, a pair of platform elevators arranged side by side, means for driving said elevators in parallelism, and a stationary part carried by said platform and disposed between said elevators to prevent grain from lodging between the latter.

16. In a combine, a main frame having a top angle bar at the forward upper edge thereof, a harvester unit adapted to be detachably connected with said main frame and including a platform section housing a part at its upper end adapted to be hooked over said top angle bar in attaching said platform, and bolt means passing through said part and said top angle member for fastening said platform in position.

17. In a combine, a main frame, a harvester unit comprising an upper platform section rigidly connected with said main frame and a lower section pivoted to said first section and having a transversely reciprocable cutter bar carried at the lower end thereof, means for raising and lowering said end of the lower platform section for varying the height of cut, and means for driving said cutter bar including a gear box on said main frame, a second gear box disposed for rocking movement about the pivot axis of said platform sections, a shaft extending from said second gear box to a point of connection with said cutter, and drive transmitting means connecting said gear boxes.

18. In a combine, a main frame, a draft hitch frame rigidly connected therewith, an elevating platform comprising two sections pivotally connected together, one of said sections being rigidly connected with said main frame and the other being movable generally vertically with respect to said first section, an adjusting lever pivotally mounted on said draft frame and connected to raise and lower said movable platform section, a reel mounted for rotation on said movable section, a lever for raising and lowering said reel relative to said movable section, and means for adjusting the position of said last named lever including a part movably carried on said adjusting lever.

19. In a combine, a main frame disposed generally transversely, a draft frame rigidly connected therewith at one end and extending generally forwardly, a forwardly disposed harvester unit including a generally vertically movable platform section carrying cutting mechanism, reel mechanism supported on said movable platform section for movement toward and away from said cutting mechanism, means on said movable platform section for raising and lowering the reel mechanism including a generally upwardly disposed rockably mounted lever, an adjusting lever pivotally mounted on said draft frame and including an operating handle section disposed generally forwardly and a rearwardly disposed section terminating adjacent the upper end of said rockably mounted lever, a link connecting the rear end of said adjusting lever with said platform section for raising and lowering the latter, link means extending from the upper end of said platform supported rockably mounted lever to a point adjacent the said end of said adjusting lever, and a shiftable handle part carried by said adjusting lever adjacent the forward end thereof and connected with said link means, whereby adjustment of the position of said adjusting handle part on said adjusting lever raises and lowers said reel mechanism relative to the vertically movable platform section substantially independently of the position relative to the draft frame that the platform section has been placed by operation of said adjusting lever.

20. In a combine, a main frame disposed transversely of the combine, a longitudinally disposed power take-off shaft journaled for rotation on said frame, a longitudinally disposed threshing cylinder journaled for rotation in parallelism with respect to said shaft, and means extending along the rear side of said main frame for driving said cylinder directly from said power take-off shaft.

21. In a combine, a threshing unit including a threshing cylinder and a separating cylinder mounted adjacent thereto, means at one side of the unit for driving said threshing cylinder, means at the other side of the threshing unit for driving said separating cylinder from said threshing cylinder, a grain tank, an elevator for elevating the clean grain into said tank, a harvester unit including cutting mechanism and means for driving the latter including a gear box mounted on the theshing unit at said other side thereof, and means at said other side for driving said clean grain elevator and said gear box from said separating cylinder.

22. In a combine, a main frame, a threshing unit carried thereby and including operating parts, a power shaft for driving said operating parts, a harvester unit connected to said main frame and adapted to deliver material to said thresher unit and including cutting mechanism and conveyor means, a gear box carried by said main frame and connected to be driven by one of the operating parts of said threshing unit, and means for driving said cutting mechanism and conveyor means from said gear box.

23. In a harvester, a main frame, a grain elevating platform comprising a pair of pivotally interconnected upper and lower sections, means rigidly fastening the upper section to said frame, means for raising and lowering the lower section, rollers journaled at the upper and lower ends of said upper and lower sections, respectively, a third roller disposed in coincidence with the pivot axis of the lower section, and an elevator canvas fastened over said rollers in a position to accommodate the pivotal movement of the lower section relative to the upper section while elevating grain.

24. In a harvester, a main frame, a draft frame connected with said main frame, a grain elevating platform including an adjustable section having cutting mechanism, a reel carried on said adjustable platform section and movable toward and away from said cutting mechanism, and means movably carried on said draft frame for raising and lowering said reel.

25. A combine comprising a generally transversely disposed main frame, a thresher unit carried thereby and including a longitud'nally disposed threshing cylinder, a transversely movable conveyor adapted to deliver material to said cylinder, and a rotary beater, and a harvester unit including a longitudinally disposed pick-up elevator extending to points adjacent said conveyor and one end of said cylinder and arranged to deliver a part of the crop directly onto said threshing cylinder and the remainder directly onto said conveyor, said beater being located substantially directly above said cylinder adjacent the point where said elevator delivers material thereto and arranged to distribute said material across said cylinder.

26. A combine comprising a generally transversely disposed main frame, a thresher unit carried thereby and including a feeder house, a threshing cylinder mounted for rotation adjacent one end of said house, a feeder house conveyor for delivering material to the upper portion of said cylinder, a rotary beater mounted above said cylinder and adapted to be driven so as to move the material onto said cylinder in substantially the same direction that it is moved by said feeder house conveyor, and a vertical conveyor disposed adjacent said threshing cylinder on the side of said rotary beater opposite said feeder house conveyor and adapted to be driven in a direction to move material down upon the threshing cylinder to prevent the material from clogging and bridging above the threshing cylinder, and a harvester unit including a transversely disposed pick-up elevator extending to points adjacent said feeder house conveyor at one end of said cylinder adjacent said vertical conveyor, said pick-up elevator being arranged to deliver a part of the crop directly onto said threshing cylinder and the remainder directly onto said conveyor.

27. In a combine, the combination of a plurality of straw walkers, means supporting said straw walkers for successive oscillation comprising a crank shaft at each end, a straw spreader disposed at the discharge end of said straw walkers in a position to receive straw therefrom, means for driving said straw walkers connected to the crank shaft at the end of said straw walkers opposite said straw spreader, and means for driving said straw spreader from the crank shaft adjacent the latter so as to distribute the discharged straw during the travel of the combine.

28. In a combine, the combination of a rotatable threshing cylinder, a conveyor for delivering material thereto, a plurality of straw walkers disposed to receive material after it has been acted upon by said threshing cylinder, means for supporting said straw walkers for oscillation, including a crank shaft at each end, means for driving said threshing cylinder, conveyor and straw walkers, a straw spreader disposed to receive straw discharged from said straw walkers, a tailings elevator for conveying material from below said straw walkers to said conveyor, and means for driving said straw spreader and said tailings elevator from one of said straw walker crank shafts, whereby the tailings are returned to the threshing cylinder and the discharged straw is distributed during the travel of the combine.

29. A combine compr'sing a generally transversely disposed main frame, a harvester unit carried by said frame and including a pick-up elevator extending to one end of said frame, a thresher unit carried by said main frame and including a plurality of straw walkers extending longitudinally of the main frame and transversely of the combine, means supporting said straw walkers for successive oscillation, comprising a crank shaft at each end of said frame, a straw spreader disposed at the discharge end of said straw walkers in a position to receive straw therefrom and at the end of said frame opposite the end to which said pick-up elevator extends, and means for driving said straw spreader from one of said crank shafts so as to distribute the straw discharged from said straw walkers during the travel of the combine.

30. A combine comprising a main frame, a thresher unit carried thereby and including a threshing cylinder and a movable conveyor adapted to deliver material to said cylinder, and a harvester unit including a platform elevator extending to points adjacent said conveyor and one end of said cylinder and arranged to deliver a part of the crop directly onto said threshing cylinder.

31. A combine comprising a main frame, a thresher unit carried thereby including a threshing cylinder and a transversely movable conveyor adapted to deliver material to the threshing cylinder, a harvester unit including a platform elevator extending to points adjacent said conveyor and one end of said threshing cylinder, said elevator being arranged to deliver a part of the crop directly onto said end of the threshing cylinder and the remainder directly onto said conveyor, and means disposed adjacent the threshing cylinder for shifting the material deposited on said end thereof toward the other end of the cylinder.

32. A combine comprising a main frame, a thresher unit carried thereby including a threshing cylinder and a transversely movable conveyor adapted to deliver material to the threshing cylinder, a harvester unit including a platform elevator extending to points adjacent said conveyor and one end of said threshing cylinder, said elevator being arranged to deliver a part of the crop directly onto said end of the threshing cylinder and the remainder directly onto said conveyor, means disposed adjacent the threshing cylinder for shifting the material deposited on said end thereof toward the other end of the cylinder, and a generally vertically disposed conveyor disposed on the side of said last mentioned means opposite the transversely movable conveyor and cooperating with said last mentioned means for feeding material to the threshing cylinder.

33. In a combine, a generally transversely disposed main frame, a longitudinally disposed threshing cylinder, a transversely movable conveyor adapted to deliver material to said cylinder and terminating adjacent to and substantially at the same level as the upper portion of said cylinder, the platform elevator arranged to discharge a portion of the material which it conveys directly onto said cylinder and the remainder onto said transversely movable conveyor, and a beater located substantially directly above said threshing cylinder to distribute material along the same.

34. In a combine, a generally transversely disposed main frame, a longitudinally disposed threshing cylinder, a transversely movable conveyor adapted to deliver material to said cylinder and terminating adjacent to and substantially at the same level as the upper portion of said cylinder, the platform elevator arranged to discharge a portion of the material which it conveys directly onto said cylinder and the remainder onto said transversely movable conveyor, and a separating cylinder disposed adjacent the threshing cylinder and underneath the end of the transversely movable conveyor which is adjacent said threshing cylinder.

35. In a combine, a main frame, a draft hitch frame rigidly connected therewith, an elevating platform comprising two sections pivotally connected together, one of said sections being rigidly connected with said main frame and the other being movable generally vertically with respect to said first section, a reel mounted for rotation on said movable section, and means movable generally with the latter for adjusting the position of the reel relative to said movable section.

36. In a combine, a main frame, a draft hitch frame rigidly connected therewith, an elevating platform comprising two sections pivotally connected together, one of said sections being rigidly connected with said main frame and the other being movable generally vertically with respect to said first section, an adjusting lever connected to raise and lower said movable platform section, a reel mounted for rotation on said movable section, a lever for raising and lowering said reel relative to said movable section, and means for adjusting the position of said last named lever, including a part movably carried on said adjusting lever.

37. In a combine, a main frame disposed generally transversely, a draft frame rigidly connected therewith at one end and extending generally forwardly, a forwardly disposed harvester unit including a generally vertically movable platform section carrying cutting mechanism, reel mechanism supported on said movable platform section for movement toward and away from said cutting mechanism, means on said movable platform section for raising and lowering the reel mechanism and including a generally upwardly disposed rockably mounted lever, an adjusting lever for raising and lowering said generally vertically movable platform section and including an operating handle section disposed generally forwardly and a rearwardly disposed section terminating adjacent the upper end of said rockably mounted lever, means connecting said rearwardly disposed section to said generally vertically movable platform section, and means shiftable longitudinally of said adjusting lever for raising and lowering said reel mechanism relative to the vertically movable platform section substantially independently of the position of the movable platform section.

38. A combine comprising a main frame, a draft hitch frame rigidly connected therewith at one side, an elevating platform connected with the main frame at the other side thereof and disposed adjacent the hitch frame, said elevating platform comprising a generally vertically movable section having a sickle supporting bar at the lower edge thereof and extending laterally of the platform toward said hitch frame, and an adjusting lever pivotally mounted on said hitch frame and operatively connected to the extended end of said sickle supporting bar for raising and lowering said movable platform section.

39. A combine comprising a main frame, a draft hitch frame rigidly connected therewith at one side, an elevating platform connected with the main frame at the other side thereof and disposed adjacent the hitch frame, said elevating platform comprising a generally vertically movable section having a sickle supporting bar at the lower edge thereof and extending laterally of the platform toward said hitch frame, a reel for said movable platform section, a laterally rigid supporting member carrying said reel and connected at its lower end to the extended end of said sickle supporting bar at laterally spaced points thereof, and means carried by said hitch frame for adjusting the position of said reel.

40. A combine comprising a main frame, a draft hitch frame rigidly connected therewith at one side, an elevating platform connected with the main frame at the other side thereof and disposed adjacent the hitch frame, said elevating platform comprising a generally vertically movable section having a sickle supporting bar at the lower edge thereof and extending laterally of the platform toward said hitch frame, and means connected with said main frame and reacting against said hitch frame and the extended end of said sickle supporting bar for counterbalancing the weight of said movable platform section.

41. A combine comprising a main frame, a draft hitch frame rigidly connected therewith at one side, an elevating platform connected with the main frame at the other side thereof and disposed adjacent the hitch frame, said elevating platform comprising a generally vertically movable section having a sickle supporting bar at the lower edge thereof and extending laterally of the platform toward said hitch frame, a reel disposed above the lower edge of the movable platform section, reel supporting means including a generally vertically extending laterally rigid member pivoted at its lower end to the extended portion of said sickle supporting bar at laterally spaced points thereon, and means counterbalancing the weight of said movable section and the reel supported thereon comprising spring means operatively connected at its upper end to said main frame and at its lower end with the extended end of said sickle supporting bar.

42. A combine comprising a main frame, a draft frame rigidly connected therewith at one side, an elevating platform disposed at the other side of said main frame adjacent the draft frame and including a generally vertically movable platform section having a sickle supporting bar at its lower end extending laterally at the movable platform section to a point adjacent the draft frame, and counterbalancing means for supporting the weight of said movable section, comprising a spring biased lever pivoted at one end to the draft frame and operatively connected at its other end to the extended end of said sickle supporting bar.

43. A combine comprising a main frame, a draft frame rigidly connected therewith and extending forwardly therefrom at one side, an elevating platform disposed at the other side of said main frame and extending forwardly alongside the draft frame, said elevating platform comprising a generally vertically movable section having a sickle supporting bar at its lower end extending laterally toward said draft frame, a reel disposed above the lower edge of said movable platform section, a reel supporting member pivotally connected at laterally spaced points to said extended end of the sickle supporting bar and extending vertically therefrom, a supporting yoke movably mounted on the upper end of said member and having laterally spaced sections receiving said reel, a laterally rigid brace pivoted at its upper end to said yoke and at its lower end to said movable platform section, counterbalancing means acting between said reel supporting member and said yoke for holding the reel in elevated position, and means movably mounted on said draft frame adjacent the forward portion thereof for raising and lowering said reel relative to said sickle supporting bar.

44. A combine comprising a transversely disposed thresher unit, a forwardly facing harvester unit, a frame supporting said units, separate brackets spaced apart laterally and secured to said frame at the under side thereof, separate ground wheels individually mounted on said brackets and directly underneath said thresher unit, and mechanism disposed on the underside of said frame and between said individually mounted wheels.

45. In a combine, a transverse main frame comprising transverse bars spaced fore and aft, thresher mechanism carried by said frame upon said bars, brackets connected with said spaced transverse frame bars laterally inwardly of their ends and extending downwardly therefrom, ground wheels mounted for rotation on said brackets and disposed thereby directly underneath said thresher mechanism so as to carry substantially all of the weight thereof, and operating units carried below said transverse bars and between said wheel brackets.

46. A combine comprising a transversely disposed main housing, grain separating mechanism disposed within said housing, ground wheels disposed directly underneath said housing and inwardly of the laterally outer ends thereof, and means for supporting said housing on said wheels.

47. A combine comprising a frame, a transversely disposed main housing supported thereon, grain separating mechanism disposed within said housing, separate brackets spaced apart laterally and secured to said frame at the under side thereof, separate ground wheels individually mounted on said brackets and directly underneath said main housing, and mechanism disposed on the underside of said frame and between said individually mounted wheels.

48. A combine comprising a thresher unit including a transversely disposed main housing and threshing and separating mechanism disposed therein, a forwardly facing harvester unit arranged to deliver harvested material into said housing, a frame supporting said units, and ground wheels journaled on said frame and disposed directly underneath said transversely disposed main housing.

49. A combine comprising a transversely disposed separator housing, grain separating mechanism disposed therein and a threshing cylinder journaled in one end thereof for rotation about a fore and aft extending axis, a forwardly facing harvester unit connected with said separator housing, a frame supporting said housing, and ground wheels journaled on said frame and disposed directly underneath said separator housing and inwardly of the laterally outer ends thereof.

50. In a combine, a feeder house, a threshing cylinder mounted for rotation at one end of said feeder house, a feeder house conveyor extending from the other end of said feeder house to said cylinder and terminating at a point spaced from said one end of the feeder house and adjacent and substantially at the same level as the upper portion of said threshing cylinder, and a platform elevator for raising harvested material from the ground and delivering said material into said feeder house and arranged so that a portion of the material delivered into the feeder house falls directly onto said threshing cylinder and the remainder of said material falls onto said conveyor and is delivered thereby to the upper portion of said threshing cylinder, said platform elevator comprising an upper elevator section mounted rigidly with respect to said feeder house and a lower elevator section pivotally supported from said upper section and movable vertically relative thereto.

51. A combine comprising a transversely disposed wheel supported main housing, grain separating mechanism disposed therein, a threshing cylinder journaled in one end of said housing for rotation about a fore and aft extending axis, a feeder house disposed above said cylinder and extending laterally inwardly above said separating mechanism, a feeder house conveyor terminating near the upper portion of said cylinder and extending inwardly therefrom across the lower portion of said feeder house, a platform elevator comprising upper and lower sections pivoted together on a transverse pivot axis, said upper section being supported rigidly with respect to said feeder house and arranged to discharge a portion of the harvested material raised from the ground directly upon said threshing cylinder and the remainder of said material falls upon said conveyor and is delivered thereby to said cylinder, said lower elevator portion having a cutter bar at the lower end thereof and means for adjusting said lower portion about said pivot axis to adjust the height of cut.

ALVIN W. OEHLER.
RALPH L. ANDERSON.
LOUIS A. PARADISE.